United States Patent [19]

McNair

[11] Patent Number: 5,559,505
[45] Date of Patent: Sep. 24, 1996

[54] SECURITY SYSTEM PROVIDING LOCKOUT FOR INVALID ACCESS ATTEMPTS

[75] Inventor: Bruce E. McNair, Holmdel, N.J.

[73] Assignee: Lucent Technologies Inc., Murray Hill, N.J.

[21] Appl. No.: 409,482

[22] Filed: Mar. 21, 1995

Related U.S. Application Data

[63] Continuation of Ser. No. 886,539, May 20, 1992, abandoned.

[51] Int. Cl.⁶ ........................................ H04Q 1/00
[52] U.S. Cl. ................ 340/825.31; 340/576; 340/825.56; 340/825.34
[58] Field of Search .................. 340/825.31, 825.34, 340/825.56, 576; 380/3.4; 70/267, 271; 235/382, 377, 380; 920/1, 5

[56] References Cited

U.S. PATENT DOCUMENTS

| | | | |
|---|---|---|---|
| 3,905,461 | 9/1975 | Davies | 902/5 |
| 3,953,769 | 4/1976 | Sopko | 340/825.31 |
| 4,492,959 | 1/1985 | Mochida | 340/825.56 |
| 4,723,625 | 2/1988 | Komlos | 340/576 |
| 4,992,783 | 2/1991 | Zdunek | 340/825.31 |
| 5,081,675 | 1/1992 | Kittirutsunetorn | 380/4 |

OTHER PUBLICATIONS

K. Dehnad "A Simple Way of Improving the Login Security", *Computers and Security*, vol. 8, No. 7, 1989, pp. 607–611.

*Primary Examiner*—Brian Zimmerman
*Attorney, Agent, or Firm*—Ronald D. Slusky

[57] ABSTRACT

A security system controlling access to a resource is arranged to operate such that when an attempt to access a resource using a password or PIN fails, the time interval "t" that must elapse before a subsequent attempt at access can be successful, is incremented. By making the increments increasingly large (illustratively, an exponential function of the number "n" of unsuccessful attempts), repeated access attempts by hackers or other unauthorized users is discouraged, because they simply cannot wait the time needed to make a large number of trial and error attempts. On the other hand, valid users, while experiencing a delay prior to access, are nevertheless able to gain access, rather than being completely "lockedout". This approach is a better compromise between access control and denial.

17 Claims, 3 Drawing Sheets

SECURITY SYSTEM PROVIDING LOCKOUT FOR INVALID ACCESS ATTEMPTS

This application is a continuation of application Ser. No. 07/886,539, filed on May 20, 1992 now abandoned.

FIELD OF THE INVENTION

This invention relates generally to security systems for preventing unauthorized access to computers, telecommunications networks and the like, and, in particular, to security systems which provide a "lockout" capability denying access in the event invalid passwords, personal identification numbers (PINs), etc. are used in attempts to gain access.

BACKGROUND OF THE INVENTION

The proliferation of remotely accessed computer and telecommunications systems have increased the need for improved security systems which check for valid passwords, PINS, and access codes/authentication codes (collectively referred to herein as "passwords") before granting access. While breaches of security can take many forms, one of the most common forms of attack by unauthorized users (sometimes called "hackers") is educated guessing and/or trial and error to discover the valid password through repeated, albeit usually unsuccessful, access attempts. With each attempt, the hacker readjusts the password being used; he/she actually gains valuable information from each denial, since most existing security systems permit access "if and only if" the correct password is entered, and deny access if any other password is entered, so that a denial reveals that an attempted password is actually invalid. The trial and error process is most often automated by the hacker, so that convergence to a correct password can sometimes undesirably be very fast.

In order to defeat the hacker or other unauthorized access seeker, legitimate users are instructed not only to keep passwords secret, but also to choose them carefully to avoid guessing. Sometimes it is difficult to insure that authorized users haven't chosen trivial variants of easily guessable words or sequences.

One attempt to improve access security was described by K. Dehnad in an article entitled "A Simple Way of Improving the Login Security", Computers and Security, Vol. 8, No. 7, 1989, pages 607–11. According to the author, the advantage gained by a hacker in repeated access attempts can be reduced by controlling the probability (p) that an authorized user will gain access to the target system even when the proper password is entered. This variability has the effect of reducing the information obtained by the hacker in being denied access: he/she cannot be sure that the denial is due to the fact that an invalid password was used, and thus may have to repeat the attempt, thereby increasing the number of trial and error attempts that may be necessary. This approach necessitates that authorized users be occasionally inconvenienced by having to enter the correct password more than once: if p=0.95, the authorized user will, on average, have to make about 105 attempts to gain access 100 times. Dehnad also suggests that the value of "p" can be reduced, thereby increasing the penalty imposed on a hacker if repeated unsuccessful access attempts are detected. While the author argues that this may be an acceptable price to pay for enhanced security, alternative solutions which have additional flexibility are desired.

To counter the threat of an attacker guessing a password by trial and error, other security systems use a control mechanism sometimes known as "lockout" that relies on counting unsuccessful attempts and completely stopping access to the person seeking access once there have been "too many" unsuccessful access attempts. When the system is "locked", subsequent access attempts, both valid and invalid, will be blocked. There are, unfortunately, problems with this approach, since it essentially trades "Access Control" for "Denial of Service". Specifically, by completely cutting off access after a preset but relatively small number of unsuccessful access attempts, the hacker is frustrated by stringent access control, but the legitimate user who unfortunately erred during attempted access attempts is also undesirably denied service or access. On the other hand, if lockout is not used at all, or is only instituted after a relatively large number of access attempts, the legitimate user may gain access more easily, but the hacker may also more frequently get through to the computer, network or other resource being accessed. To date, there has been no compromise solution.

SUMMARY OF THE INVENTION

In accordance with the present invention, a security system controlling access to a resource is arranged to operate such that when a user's attempt to access a resource using a password fails, the time interval "t" that must elapse before a subsequent attempt at access by that user can be successful, is increased. By making the increments increasingly large (illustratively, an exponential function of the number "n" of unsuccessful attempts), repeated access attempts by hackers or other unauthorized users is discouraged, because they simply cannot wait the time needed to make a large number of trial and error attempts. On the other hand, valid users, while experiencing a delay prior to access, are nevertheless able to gain access, rather than being completely "locked-out".

In accordance with a feature of this invention, the value of "t" may be decreased in relatively small decrements "d" in response to each of "m" subsequent valid access attempts. By maintaining the value of "t" at a high level after multiple unauthorized access attempts, the authorized user is alerted that there may have been an attempt at unauthorized access. Also, an attempt by a hacker to time access attempts to correspond to valid user actions is frustrated. The approach used in the present invention is thus a better compromise between access control and denial.

BRIEF DESCRIPTION OF THE DRAWING

The invention will be better appreciated by consideration of the following detailed description, when read in light of the accompanying drawing in which.

DETAILED DESCRIPTION

Figure 1:
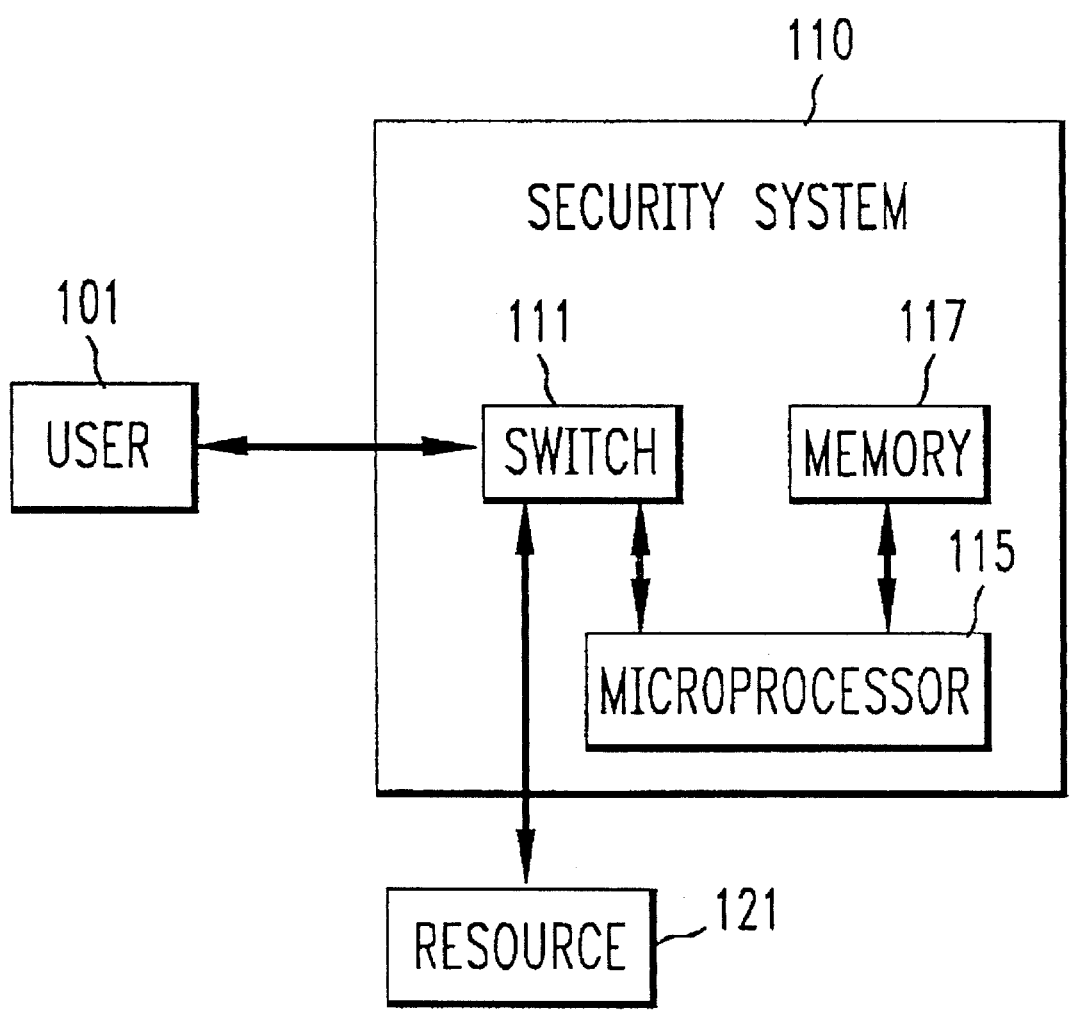
FIG. 1 is a block diagram of a security system embodying the access control system of the present invention.
Figure 2:
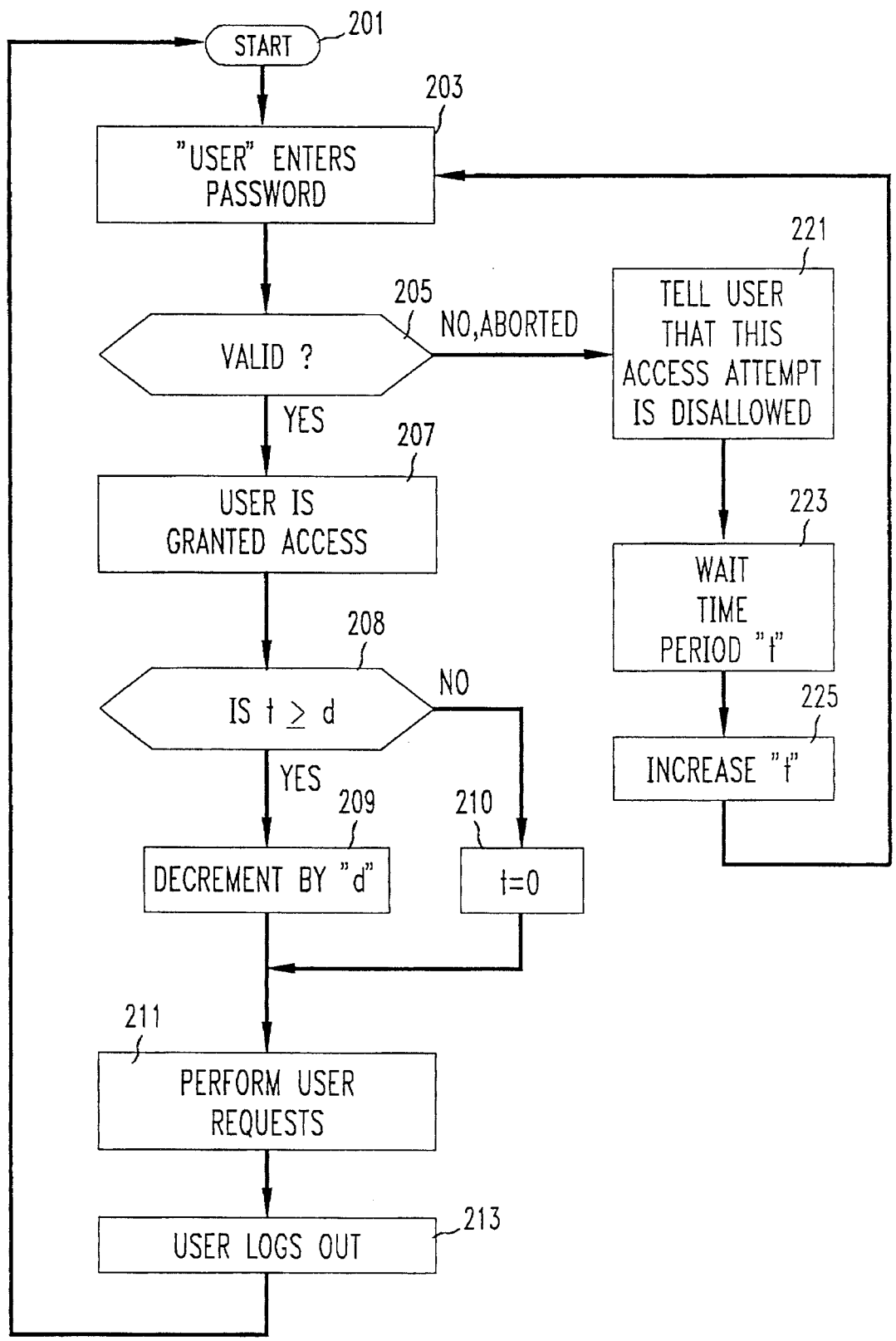
FIG. 2 is a logic flow diagram illustrating the steps followed in the system of FIG. 1.

Referring first to FIG. 1, a user 101 is connected to a resource 121 via a security system designated generally as 110. Resource 121 can be a computer, a telecommunications switch, an automatic teller machine (ATM), or any other instrumentality to which access is generally restricted to authorized users. Security system 110 includes a switch 111 which must be "closed" in order for user 101 to access resource 121. When switch 111 is "open", access is blocked or denied. The state or status of switch 111 is controlled by a microprocessor 115 in security system 110 that performs logical operations under the control of programs stored in an associated memory 117. The process carded out by the stored programs is illustrated in FIG. 2, discussed below. Persons skilled in the art will understand that the representation of FIG. 1 is illustrative, that switch 111 may be a logical or physical switch, i.e., any instrumentality that either permits or denies access to resource 121, and that user 101, security system 110 and resource 121 can be partially or totally co-located or separated and interconnected by appropriate linkages such as communication lines.

The process of FIG. 2 begins in step 201, when user 101 desires to access resource 121, and accordingly communicates with and supplies a password to microprocessor 115 in step 203. This password can be an alphanumeric code or other indicia that can be recognized by microprocessor 115 as valid or invalid. Common examples are passwords associated with making long distance phone calls, banking transactions at ATM's, logons to computer systems, etc.

In step 205, the password is compared to a list of valid passwords, which illustratively may be stored locally in memory 117, or which can be stored remotely and accessed via a database query or lookup in well known fashion. If the password is determined to be valid, user 101 is granted access to resource 121 in step 207. Then, in accordance with the invention, if the value of a delay variable "t" (discussed more fully below) is determined in step 208 to be greater than or equal to the value of a predetermined value "d", the value of "t" is decremented by the amount "d" in step 209, and user 101 may continue to access resource 121 as desired, in step 211. If the value of "t" was less than "d", then "t" is set to zero (or some other predetermined minimum) in step 210. When user 101 has completed use of resource 121 (e.g., the transaction is completed, the telephone call is terminated, or the computer session is over and the user is ready to log-out), the use of resource 121 is terminated in step 213 and the process returns to step 201 to await a subsequent access request.

If it is determined in step 205 that the password presented by user 101 is not valid, the process of FIG. 2 proceeds to step 221, in which user 101 is advised that the present access attempt was unsuccessful, that access is being disallowed, but that the user can try again. This concept is important, because it allows the authorized user who has made "an honest error" to successively attempt access more than once. These subsequent attempts will be successful, once the correct password is entered, even though, as described below, the valid user will suffer the inconvenience of waiting a longer time between access attempts. Then, in step 223, a time delay of length "t" is introduced into the access process. Initially, the value of "t" may be zero or another relatively small value, such as 1 second. However, in step 225, the value of "t" is increased. The access process is then repeated by returning to step 203.

If a subsequent attempt to access the resource is invalid, the time delay introduced in step 223 is larger than on the previous attempt, because of the increase introduced in step 225. The choice of the amount of the increase is a design parameter, and can be chosen based upon the desired trade-off between security against hackers on the one hand and inconvenience to the legitimate user on the other hand. In most implementations, it is considered advantageous that the increase in the value of "t" be greater for successive access attempts. Mathematically, if "n" is an integer representing the number of attempts made (n=1, 2, . . . ), then t=f(n), where the function can be multiplicative, e.g., $t=k \times n$, where k is an integer greater than one, exponential, e.g., $t=n^k$, where k is a number greater than one, or any other function that increases relatively rapidly as the number "n" of invalid access attempts increases. It is to be noted that the increase in the value of "t" that occurs in step 225 (as well as the decrease that occurs in step 209) can be implemented by a simple calculation performed in processor 115, or a table look-up that retrieves a value for "t" associated with each value of "n" from a stored table.

Figure 3:
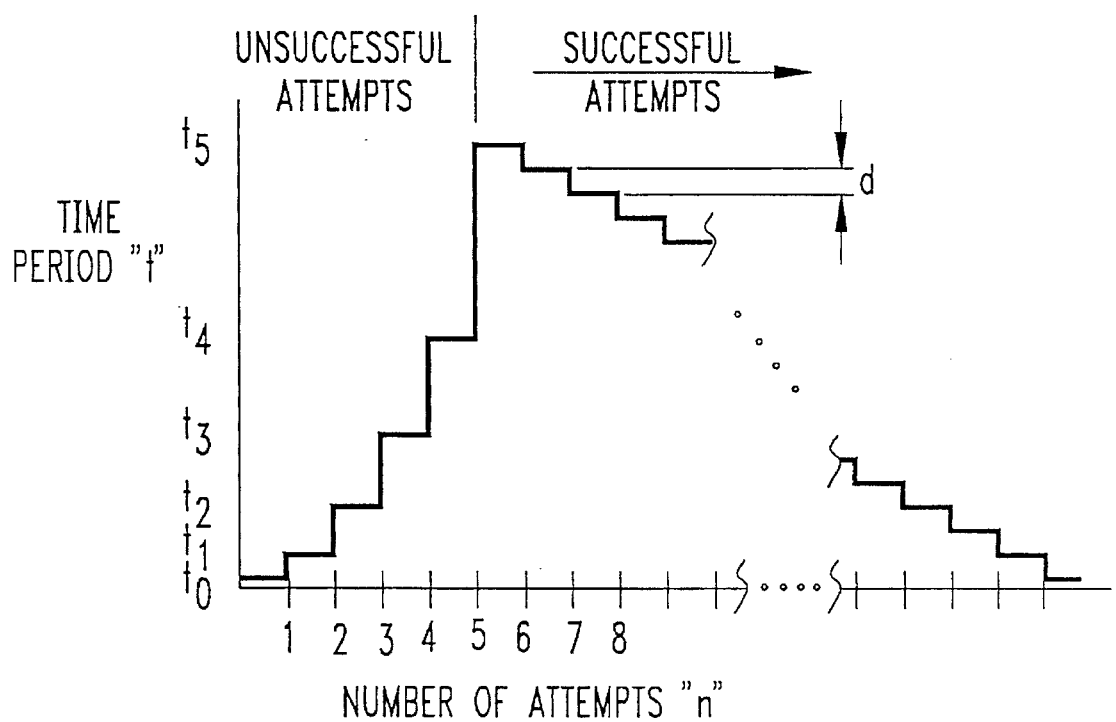
FIG. 3 is a graph illustrating one example of the relationship, in accordance with this invention, between the number "n" of unsuccessful access attempts made by a user seeking access to a resource, the number "m" of successful access attempts made thereafter, and the value of "t" indicating the time interval that must elapse before a subsequent attempt at access by that user can be successful.

FIG. 3 is a graph illustrating one example of the relationship, in accordance with this invention, between the number "n" of unsuccessful access attempts made by a user seeking access to a resource, the number "m" of successful access attempts made thereafter, and the value of "t". Initially, the value of "t" is shown as zero, although a small delay, simply due to processing, is normally encountered. In this example, after each of the first 5 successive access attempts, the value of "t" increases from $t_1$ to $t_5$ by virtue of the increase introduced in step 225 of FIG. 2, such that the difference between successive values of "t" (corresponding to successive values of "n") increases substantially. Thus, $t_2$ minus $t_1$ is less than $t_3$ minus $t_2$, and so on in the example of FIG. 3, it is assumed that the hacker is discouraged by the long delay experienced after 5 unsuccessful attempts at access, and discontinues his/her efforts.

Thereafter, the authorized user successfully gains access to the resource through a series of "m" additional access attempts. Initially, the value of "t" is the value ($t_5$) last computed in step 225 of FIG. 2. The fact that the delay is larger than normal serves to alert the user that a hacking episode may have occurred, such that certain protective responses may be contemplated. For each subsequent successful access attempt, the value of "t" is decremented by an amount "d" in step 209 of FIG. 2, such that $t=t_5-(m * d)$. When t<d, the value of t is set to zero in step 210. This "graceful" decrementing of the value of "t" following a series of attempts at unauthorized access may be somewhat inconvenient to an authorized user, since longer than usual delays will be experienced. The inconvenience may be warranted, however, because it avoids the risk associated with automatic zeroing of the value of "t" following a successful access attempt: in that event, there is a possibility that a hacker can discover a pattern of authorized access (at which "t" is reset by the authorized user) and time his/her hacking attempts to coincide with those times, thereby taking advantage of the fact that the value of "t" is low. Note too that the inconvenience of a slow return to a small value of "t" may be avoided by some type of intervention in the process of FIG. 2, whereby the value of "t" is explicitly reset. This could be accomplished, for example, by the user calling a system operator or other individual capable of over-riding the process.

Various modifications can be made to this invention without departing from the basic principles outlined above. For example, the function by which the value of "t" is increased for each of "n" access attempts can be different for different users. Also, the value can be different, depending upon the type of access or the nature of the resource being accessed. As an example, if resource 121 is the long distance telephone network, an initial determination can be made as to the value of the call being placed. For more expensive calls, the relationship between the parameters "t" and "n" can be adjusted so as to defeat hackers more often than with respect to less costly calls.

I claim:

1. A system for controlling access of a user to a resource comprising means for determining the validity of a user-entered password, means for allowing access to the resource if the password is valid, means for allowing the same user to re-attempt access to said resource after a time interval "t", and means for repeatedly increasing the value of "t" as a function of the number of invalid access attempts by the user.

2. The system defined in claim 1 wherein "n" is an integer representing the number of invalid access attempts by the user and "t" is a function of "n".

3. A system for controlling access to a resource comprising means responsive to an access request for permitting access to said resource upon entry of a valid password assigned to a user of said system and for denying access to said resource upon entry of an invalid password, and means for applying successive requests to said first means after a variable time interval "t", the value of said time interval being increased as a function of the number of entries of invalid passwords.

4. The invention defined in claim 3 wherein the length of said variable time interval "t" is a function of the number "n" of entries of invalid passwords.

5. A system for controlling access to a resource comprising means responsive to an access request for permitting access to said resource upon entry of a valid password assigned to a user of said system and for denying access to said resource upon entry of an invalid password, and means for applying successive requests to said first means after a variable time interval "t", the value of said time interval being increased upon each unsuccessful access attempt, said applying means being arranged to decrement, up to a predetermined minimum, the value of said time interval upon each of "m" successful access attempts.

6. The invention defined in claim 5 wherein the length of said variable time interval "t" is a function of the number "n" of unsuccessful attempts and the number "m" of successful attempts.

7. The invention defined in claim 4, wherein said function is an exponential function.

8. Apparatus for permitting access by a user to a resource upon entry of a valid password, including means for storing a list of valid passwords corresponding to each user of said resource, means for comparing the password presented by a user with the corresponding stored password to determine its validity, means for permitting access upon a positive comparison, means for denying access upon a negative comparison, and means for permitting a repeated attempt at access after a time period "t", wherein the value of "t" is repeatedly increased as a function of the number of unsuccessful access attempts by said user.

9. The invention defined in claim 8, wherein the value of "t" is decreased as a function of the number of successful access attempts by said user.

10. A method for controlling access of a user to a resource comprising the steps of determining the validity or invalidity of a user entered password allowing access if the password is valid, allowing the same user to re-attempt access to said resource after a time interval "t", and repeatedly increasing the value of "t" as a function of the number of invalid access attempts by the user.

11. The method defined in claim 10, wherein "n" is an integer representing the number of invalid access attempts by the user and "t" is a non-linear function of "n".

12. A method for controlling access to a resource comprising the steps of responsive to an access request, permitting access to said resource upon entry of a valid password assigned to a person authorized to access said resource and for denying access to said resource upon entry of an invalid password, and applying successive access requests to said first means after a variable time interval, the value of said time interval being repeatedly increased as a function of the number of access requests in which an invalid password is entered.

13. The method defined in claim 12 further including the step of decreasing the value of said variable time interval as a function of the number of access requests in which a valid password is entered.

14. The method defined in claim 13 wherein said function of the number of access requests in which a valid password is entered is a geometric function.

15. A method for permitting access by a user to a resource upon entry of a valid password, including the steps of storing a list of valid passwords corresponding to each user of said resource, comparing the password presented by a user with the corresponding stored password to determine its validity, permitting access upon a positive comparison, denying access upon a negative comparison, and permitting a repeated attempt at access after a time period "t", wherein the value of "t" is repeatedly increased as a function of the number of unsuccessful access attempts by the user.

16. The method defined in claim 15 wherein the value of "t" is decreased as a function of the number of successful access attempts by said user.

17. The method defined in claim 15 wherein said function is non-linear.

* * * * *